Sept. 14, 1948. G. H. GLOSS ET AL 2,449,293
PROCESS FOR PRODUCTION OF MAGNESIUM COMPOUNDS
Filed May 2, 1944 3 Sheets-Sheet 3
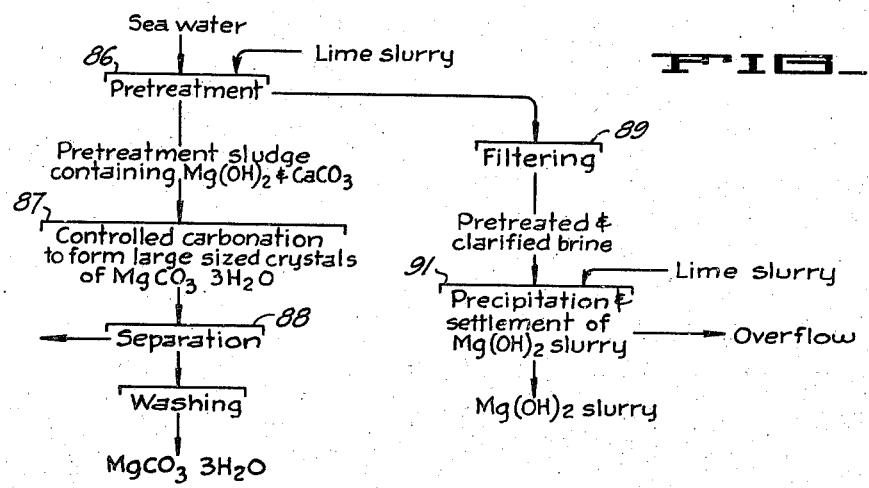
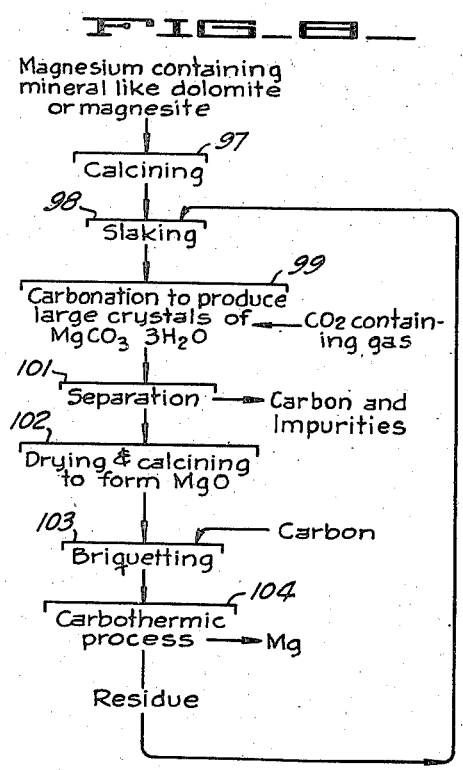
INVENTORS
GUNTER H. GLOSS
EDGAR B. BAKER
BY
ATTORNEY Patented Sept. 14, 1948

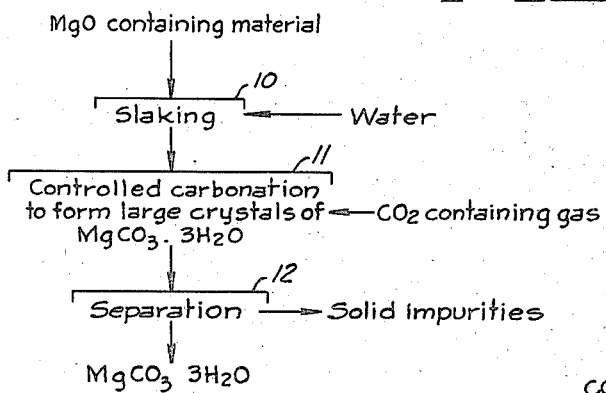
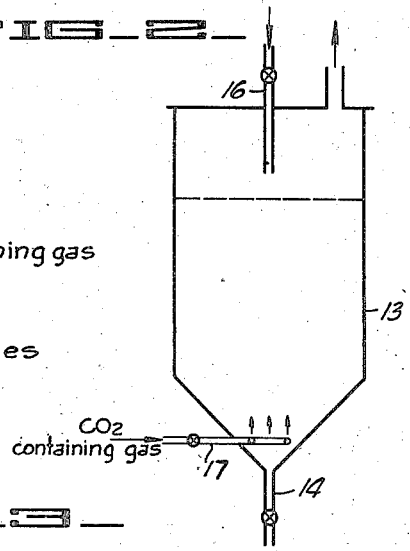
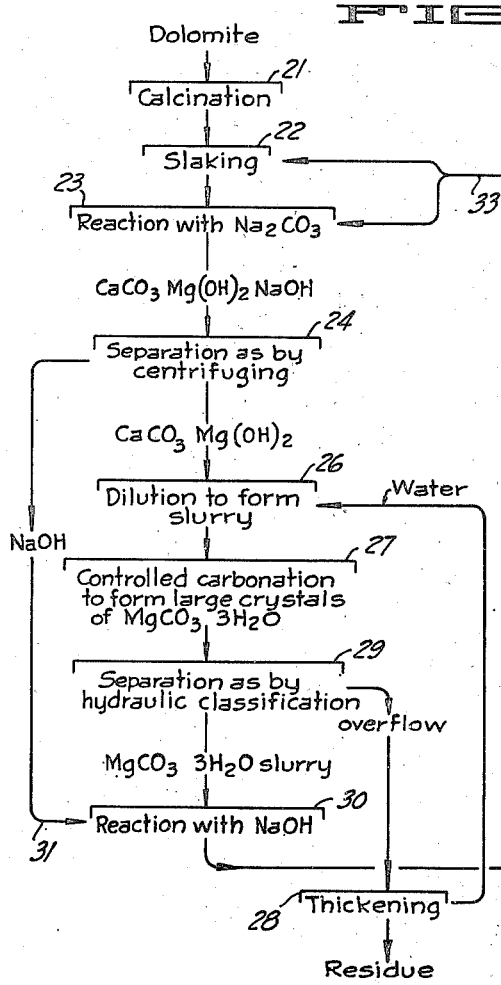
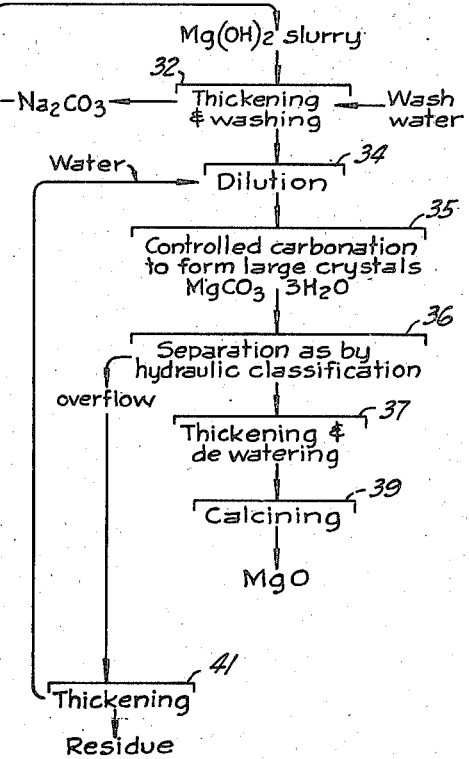

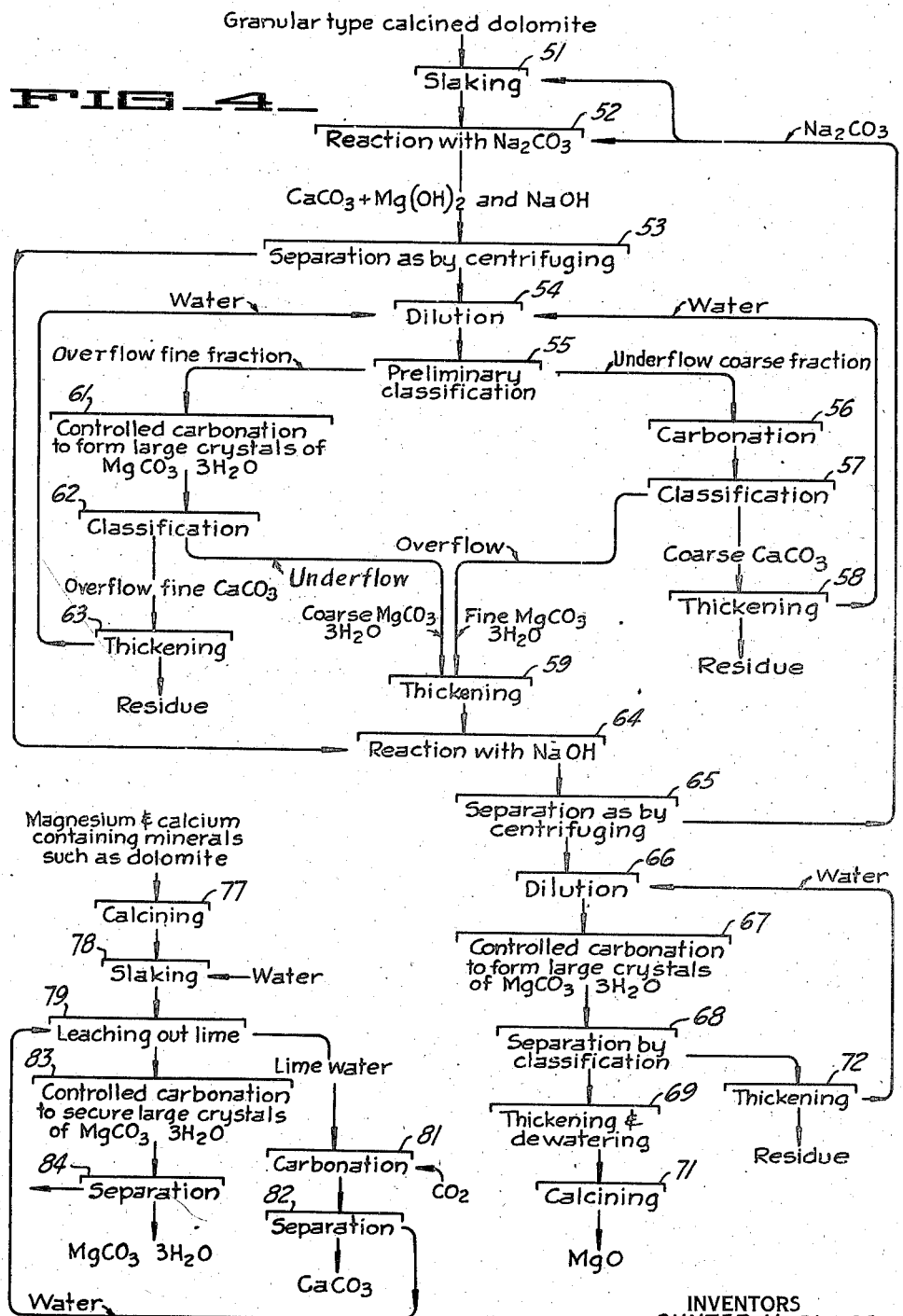

2,449,293

UNITED STATES PATENT OFFICE 2,449,293

PROCESS FOR PRODUCTION OF MAGNESIUM COMPOUNDS

Gunter H. Gloss, Redwood City, and Edgar B. Baker, Burlingame, Calif., assignors to Marine Magnesium Products Corporation, South San Francisco, Calif., a corporation of Delaware Application May 2, 1944, Serial No. 533,704

7 Claims. (Cl. 23—67)

This invention relates generally to processes for the production of magnesium compounds from various magnesium containing materials.

In the past many methods have been utilized for the purpose of producing magnesium compounds from various magnesium containing minerals such as dolomite, magnesite, and brucite. All of these processes have definite limitations with respect to cost of production and the purity of the magnesium compounds which can be produced. Either they have been unable to produce magnesium compounds having a purity of say 95 to 98%, or if such purities have been attained then the cost of production has been excessive. Furthermore the plant equipment required has been expensive and elaborate, thus adding to capital investment and cost of production.

It is an object of the present invention to provide a method of the above character which will go beyond the limitations of prior art processes. Particularly the present method makes possible production of purer magnesium compounds at lower cost. In addition it makes possible high recoveries and high capacity production of magnesium compounds from magnesium containing raw materials without an undue capital investment for equipment.

Another object of the invention is to provide a controlled carbonating procedure making possible production of large size neutral magnesium carbonate crystals, whereby such large size particles can be readily separated by hydraulic classification from other solid phase material, such as calcium carbonate and the like.

Another object of the invention is to provide a process for producing magnesium compounds which will not consume large amounts of chemicals, and which will not require large quantities of fresh water, such as is necessary in many prior processes.

A further object of the invention is to provide a process applicable to a wide variety of minerals or other magnesium containing mixtures. In this connection the present invention can be applied to virtually all dolomitic minerals, whereas it is well known that some prior art mechanical separation methods are applicable only to certain types of dolomitic minerals.

Additional objects of the invention will appear from the following description in which the preferred embodiment has been set forth in detail in conjunction with the accompanying drawing.

Referring to the drawing:

Figure 1 is a flow diagram illustrating one procedure for carrying out the invention.

Figure 2 illustrates a piece of equipment which can be used for the carbonating operation.

Figure 3 is a flow sheet for carrying out the invention on materials like dolomite, and which produces a relatively pure magnesium compound.

Figure 4 is a flow sheet illustrating a procedure for the treatment of a relatively granular form of calcined dolomite.

Figure 5 is a flow sheet illustrating a further embodiment, involving a preliminary removal of a part of the calcium content prior to treatment for removal of the magnesium content.

Figure 6 is a flow sheet illustrating another embodiment of the invention in which the source of magnesium is sea water or like brine containing convertible magnesium salts.

Figure 7 is a flow diagram illustrating another embodiment likewise utilizing sea water as a source of magnesium.

Figure 8 is a flow sheet illustrating another embodiment in which residue from a thermal reduction process is utilized as a source of magnesium.

The present invention is characterized by a particular type of controlled carbonation carried out on a slurry containing magnesium oxide or magnesium hydroxide or both, and which carbonation serves to form large sized crystals of neutral magnesium carbonate ($MgCO_3 \cdot 3H_2O$). Referring first to Figure 1 a magnesium oxide containing material is shown being subjected to slaking at 10, whereby slurry is produced containing magnesium oxide, hydroxide, or both. The magnesium oxide containing material can be produced by calcining a wide variety of materials and mixtures, as for example dolomite, magnesite, brucite, serpentine, or residues having a magnesium content which will be converted to magnesium oxide upon calcining. Slaking can be accompanied by grinding to provide a particle size such that the bulk of the particles are less than 5 microns in diameter. This particle size is desirable in order to make feasible the subsequent classification step. In step 11 the slurry is subjected to controlled carbonation to form large sized crystals of neutral magnesium carbonate ($MgCO_3 \cdot 3H_2O$). The material is then subjected to a separating operation 12 whereby the neutral magnesium carbonate is separated out from other solid phase impurities which for example may include calcium carbonate, silica, etc.

Controlled carbonation at 11 can be carried out either as a batch operation, or continuously. In ordinary carbonation of magnesium oxide or hydroxide neutral magnesium carbonate is produced of relatively small particle size, which can not be readily separated from other solid phase material, such as calcium carbonate. We have found however that if the carbonating step is so controlled that the rate of conversion of magnesium oxide or hydroxide into solid phase neutral magnesium carbonate is held below certain limits, the bulk of the neutral magnesium carbonate will be formed with a particle size between 200 to 400 microns, or even larger, in contrast to a particle size of say 15 to 40 microns, with ordinary rapid carbonation. According to our discovery the desired large particle size can be secured when the rate of conversion of magnesium oxide or hydroxide into the solid phase neutral magnesium carbonate is not in excess of 0.12 mol per gallon per hour, and preferably somewhat slower. In practice the rate of conversion is controlled by maintaining the concentration of the liquid phase (total $CO_3$ and $HCO_3$ ions) between certain upper and lower limits. According to our observations good results are secured when the concentration of the liquid phase at no time falls below about 0.02 mol per liter, and does not exceed 0.05 mol per liter. When controlled in this manner the bicarbonate concentration may fall within the limits of about 0.01 to 0.015 mol per liter.

To carry out batch carbonation with control as described above, apparatus such as illustrated in Figure 2 can be employed. This consists of a simple tank 13 which contains an initial quantity of the slurry to be carbonated, and which has a discharge pipe 14 at its lower end. Pipe 16 is for the purpose of introducing the slurry, and pipe 17 serves to introduce a carbon dioxide containing gas, such as flue gas. Introduction of the flue gas will generally effect sufficient agitation of the material, or if the gas is relatively concentrated with respect to its carbon dioxide content, slow mechanical agitation can be employed. To carry out a carbonating operation an initial batch of the slurry is introduced into the tank 13, and this batch is then seeded with a small amount of previously produced neutral magnesium carbonate. The solids concentration of the slurry may vary from say 0.5 to 1.5 moles per liter of MgO. It is desirable to introduce a sufficient quantity of the seed crystals to prevent the formation of new small crystals during the initial stages of the carbonation. Flue gas is now introduced into the mass of material through pipe 17 at a relatively slow rate, and continued until all of the magnesium hydroxide of the batch has been converted to solid phase neutral magnesium carbonate. At this time introduction of further slurry through pipe 16 is commenced and is maintained continuously in balance with the flow of flue gas. This balance is such that the concentration of the liquid phase is kept between the limits of 0.02 to 0.05 mol per liter, as explained above. Carbonation is continued under such conditions until the carbonating vessel is filled, at which time the charge is drained off through the pipe 14. Instead of draining off all of the charge through pipe 14 it is feasible to bleed off the solid phase material at a controlled rate, whereby the process is operated continuously. In general the carbonating equipment should be designed and operated whereby it provides a retention period of about 36 to 48 hours for the feed slurry. The entire carbonating operation is carried out under normal atmospheric temperatures, ranging for example from 10° to 30° C.

As previously stated the neutral magnesium carbonate is of relatively large particle size and can be readily separated by suitable known methods, such as hydraulic separation or classification, from other solid phase impurities such as calcium carbonate, silica, silicates and the like. The removed neutral magnesium carbonate can then be treated to form other magnesium compounds, as for example it can be calcined to form magnesium oxide, or heated to an elevated temperature to convert it to basic magnesium carbonate.

In the slaking operation 10 the temperature of the slurry may rise to the boiling point due to the hydration of the calcium oxide, but by the time the latter reaction is completed the less reactive magnesium oxide may be only partially hydrated. It is possible to extend the period of slaking until all of the magnesium oxide is hydrated, but the slurry being introduced into the following carbonating operation 11 may contain either magnesium oxide or hydroxide or a mixture of both.

The purity of the magnesium compound produced by the process of Figure 1 is dependent partly upon the proportion of magnesium oxide to other compounds present in the material undergoing treatment. If there is a relatively high lime content in the material, as with dolomite, some calcium carbonate will occlude with the crystals of neutral magnesium carbonate, thus affording a lime contamination. Where relatively pure magnesium compounds are required, and dolomite is being utilized as a source of raw material, we can make use of the two stage carbonating process shown in Figure 3. In this instance dolomite is subjected to complete calcining at 21 and slaking at 22 to form a slurry containing both magnesium oxide and calcium hydroxide. As will be presently explained it is desirable to use a solution of sodium carbonate for this step, in place of fresh water, with conversion of a minor part of the calcium oxide to calcium carbonate. The slurry is reacted at 23 with a solution of sodium carbonate whereby the calcium hydroxide is converted to calcium carbonate and the sodium carbonate is converted to sodium hydroxide. This material is then subjected to separation at 24, as by centrifuging, whereby the sodium hydroxide is removed in liquid phase and whereby the resulting centrifuge cake contains calcium carbonate and magnesium oxide or hydroxide or both. This centrifuge cake is then diluted with water at 26 to form a slurry, and the slurry is subjected to controlled carbonation at 27, the same as the controlled carbonating step 11 of Figure 1. In this controlled carbonating operation the magnesium oxide or hydroxide is converted to large sized crystals of neutral magnesium carbonate. The carbonated material is then subjected to suitable separation treatment at 29 as by hydraulic or centrifugal classification, whereby the fast settling neutral magnesium carbonate readily separates out as an underflow, and the calcium carbonate and other solid impurities are removed in the overflow. Water can be removed from the overflow in the thickening operation 28 and reused back in the process, as for example in the diluting operation 26 as indicated.

The neutral magnesium carbonate at this point in the process is not as pure as may be desired for certain applications. It is therefore subjected to further treatment including reaction with sodium hydroxide in step 30, the sodium hydroxide being preferably obtained from the separating operation 24, as indicated by line 31. In this reaction the magnesium carbonate is converted to magnesium hydroxide, whereas the sodium hydroxide is converted to sodium carbonate. Thus sodium carbonate is made for cyclic reuse in the reaction step 23. The resulting slurry is then subjected to the thickening and washing operation 32, and the effluent from this operation which contains sodium carbonate can be utilized in the reaction operation 23, as indicated by line 33. Also a part of this effluent can be used in place of fresh water for slaking 22, whereby a minor part of the calcium oxide is immediately reacted with sodium carbonate. The thickened solid phase material is then subjected to dilution at 34, preferably after grinding or violent agitation to break up agglomerates, and the resulting slurry then subjected to controlled carbonation 35. This controlled carbonation is the same as that previously described, to again produce large sized particles of neutral magnesium carbonate. Carbonated material from this operation is then subjected to suitable separation treatment 36 as by hydraulic or centrifugal classification, whereby the neutral magnesium carbonate is removed in an underflow and is then subjected to the thickening and dewatering operation 37. The dewatered material can then be calcined at 39 to form magnesium oxide. The overflow from classifying operation 36 can be subjected to thickening at 41 whereby the effluent is made available for use back in the process, as in the diluting operation 34 as indicated.

In the second controlled carbonating operation 35 the neutral magnesium carbonate produced is relatively free of occluded calcium. Therefore the final magnesium compound produced from this carbonate is of relatively high purity.

In the process of Figure 3 it is feasible to operate the first carbonating operation 27 and subsequent separation 29 whereby the overflow from 29 contains about 85 to 90 mol percent of the total calcium, and about 10 to 20 mol percent of the total magnesium, with the underflow passing to operation 28 containing 80 to 90 mol percent of the magnesia and 10 to 15 mol percent of the calcium. After the second carbonating operation 35 the overflow from the separating or classifying operation 36 can contain from 8 to 13 mol percent of the total initial calcium and 4 to 6 mol percent of the total magnesia. The final magnesium oxide from the calcining operation 39 can contain for example about 3% calcium oxide, together with small amounts of impurities such as silica and iron, depending upon the composition of the original dolomite. With a typical type of dolomite containing after calcination 40% magnesium oxide and 55% calcium oxide, the amount of neutral magnesium carbonate obtained (MgO basis) is about 75% of that originally present in the calcined dolomite and the purity is of the order of 96% or better.

Sodium carbonate is a relatively inexpensive chemical for use in the process of Figure 3. In place of this alkali carbonate, it is possible to use potassium carbonate. The concentration of the sodium carbonate solution 33 is maintained within suitable limits, such as of the order of 1 mol per liter, with occasional additions of sodium carbonate to compensate for losses from the system. In general however the consumption of sodium carbonate will be negligible.

Some calcined dolomites are relatively granular so that after hot slaking and agitation a substantial amount of material remains in the form of hard agglomerates which are difficult to comminute to a particle size of 5 microns or less by grinding. Furthermore such a grinding operation would be expensive to the point of making its use prohibitive. When such granular materials are encountered it is preferable to utilize a process such as shown in Figure 4, in which during the treatment the material is divided into coarse and fine fractions which are separately treated. Thus the calcined dolomite in this instance is subjected to slaking at 51, to form a slurry for the reaction operation 52. Here the slurry is reacted with sodium carbonate the same as reaction operation 23 of Figure 3. The calcium content of the slurry is thus converted to calcium carbonate, with formation of sodium hydroxide. After the reaction operation the material is subjected to the separation operation 53, as by centrifuging, and the centrifuge cake is then diluted at 54, and passed to the preliminary classifying operation 55. This preliminary classification is carried out by suitable hydraulic or centrifugal equipment, capable of maintaining an overflow of fine material, and an underflow of coarse material. The coarse fraction or underflow contains the aforesaid hard granular agglomerates. This coarse material is then subjected to conventional carbonation at 56, which can be carried out by contacting the material with flue gas under such conditions that carbonation occurs very rapidly. During carbonation the magnesium hydroxide occluded in the granular agglomerates is extracted and converted into separate small crystals of neutral magnesium carbonate. Due to the fact that the carbonation is carried out rapidly the particle size of the neutral magnesium carbonate is relatively fine. The carbonated material is then subjected to a classifying operation 57, which is carried out with suitable equipment whereby there is maintained an overflow of fine material, and an underflow of coarse material. The overflow consists mainly of fine particle size neutral magnesium carbonate, while the underflow consists mainly of coarse or granular agglomerates of calcium carbonate. The underflow can be subjected to thickening 58, thus affording water which can be reused back in the process, as for example for the dilution operation 54. The overflow from the classifying operation 57 is sent to the thickening operation 59 for further treatment as will be presently explained.

The overflow of fine dolomitic material from the preliminary classification 55 is subjected to controlled carbonation 61 as previously described, to form large crystals of neutral magnesium carbonate. This carbonated material is then passed to a classifying operation 62, which is carried out in suitable classifying equipment capable of establishing an overflow of fine material, and an underflow of coarse material consisting mainly of neutral magnesium carbonate. This coarse material is likewise sent to the thickening operation 59. The overflow from classifying operation 62, which consists mainly of small particle size calcium carbonate, together with some magnesium carbonate, can be sent to the thickening operation 63, to provide water for reuse in the process, as for example use in the diluting operation 54. The thickened material from 59, which represents the fine and coarse neutral magnesium carbonates from the classifying operations 57 and 62 is preferably further purified in a series of steps including reaction at 64 with sodium hydroxide. Sodium hydroxide for this operation can be obtained by utilizing effluent from the separating operation 53, as indicated. After this reaction the material is subjected to the separating operation 65, as by centrifuging, and the effluent from this operation, which contains sodium carbonate, can be reused for the reaction operation 52, as indicated. The centrifuge cake from operation 65 is shown being diluted at 66 to form a slurry for the controlled carbonation operation 67. This operation is carried out by the procedure previously described in order to produce large crystals of neutral magnesium carbonate. The carbonated material is passed to the separating operation 68, which can be carried out by suitable classifying equipment, for separating out the desired neutral magnesium carbonate. The underflow from the classifying operation is shown being further treated by thickening and dewatering 69, and calcining 71, to produce magnesium oxide. The overflow from classifying operation 68 is shown passing through the thickening operation 72, to produce an effluent which can be utilized as water in the dilution operation 66. Residues from both thickening operation 63 and 72 contain calcium carbonate together with other solid phase impurities such as silica and the like, and varying quantities of residual neutral magnesium carbonate.

In both the processes of Figures 3 and 4 neutral magnesium carbonate is reacted with sodium hydroxide to obtain a magnesium hydroxide for further purification. Before reaction with sodium hydroxide it is possible to convert the neutral carbonate to basic magnesium carbonate, by application of heat.

In place of utilizing two stages of controlled carbonation to secure a relatively pure form of neutral magnesium carbonate, it is possible to utilize preliminary treatment for the purpose of removing a substantial amount of the lime content, prior to treating the remaining part of the slurry for removal of neutral magnesium carbonate. Thus referring to Figure 5, dolomite is shown being subjected to calcining 77, and slaking 78 to form a slurry containing magnesium oxide and calcium hydroxide. At 79 this slurry is treated for removal of a substantial amount of the lime content. While the methods employed for this purpose may vary, it is possible for example to utilize a leaching process such as disclosed in Patent No. 734,030 of 1903, to Young. Thus according to the process of this patent water is utilized to leach out a substantial part of the lime content, with withdrawal of a clarified lime solution as indicated, which is subjected to a carbonating operation 81 to precipitate calcium carbonate. In a suitable separating operation 81 this calcium carbonate, or precipitated chalk, can be removed, and the water returned for leaching as indicated.

The remaining solid phase material from the operation 79, which according to Young's process would be a very impure and practically useless grade of magnesia, is then subjected to the controlled carbonation 83, which is carried out in the same manner as previously described. Carbonated material from this operation, which contains large crystals of neutral magnesium carbonate, is then subjected to the separating operation 84, to separate out the desired neutral magnesium carbonate. By means of the process of Fig. 5 the amount of calcium present during the controlled carbonation is reduced whereby the amount of calcium occluded with the particles of neutral magnesium carbonate is materially reduced. Thus with such a combination process it is possible to produce a relatively pure form of neutral magnesium carbonate.

Figure 6 shows application of the invention to a process wherein magnesium compounds are derived from brines containing convertible magnesium salts, such as sea water. Thus in this instance sea water is subjected to a pretreatment 86 primarily for the purpose of removing dissolved calcium bicarbonate. This operation involves reacting the brine with small amounts of lime or dolomite slurry as indicated, and can be in accordance with Clarke Patent 2,276,245. The procedure disclosed in that patent involves use of a activated sludge which is continuously recirculated into contact with the incoming brine, and which aids in securing complete precipitation of calcium bicarbonate as insoluble calcium carbonate. Sludge is continuously bled off from this circuit and consists of solid phase calcium carbonate and a considerable amount of precipitated magnesium hydroxide, together with large quantities of organic and inorganic impurities. In Figure 6 this sludge is shown being passed to the controlled carbonation operation 87, which is carried out in such a manner as to produce large sized crystals of neutral magnesium carbonate. The carbonated material is then passed to the separating operation 88, whereby after washing as indicated a relatively pure form of neutral magnesium carbonate is removed. The brine or sea water from the pretreatment operation 87 is shown being passed to further treatment for removing magnesium hydroxide from the same. This further treatment can include filter 89 for the purpose of clarifying the brine, and precipitation and settlement at 91 where the brine is reacted with lime slurry to precipitate magnesium hydroxide. A precipitation procedure of this character is disclosed for example in Chesny Patent No. 2,089,339 of 1937. The magnesium hydroxide slurry recovered from operation 91 can be further purified by washing.

A dolomite slurry, that is one formed by slaking a calcined dolomite, is preferable for pretreatment 86 because its use results in a higher percentage of magnesium hydroxide in the resultant sludge.

Figure 7 illustrates another procedure in which the invention is utilized in conjunction with production of magnesium compounds from sea water. The sea water in this instance requires no pretreatment and is shown being subjected directly to precipitation with lime or dolomite at 92, with settlement of the precipitated magnesium hydroxide and other solids to form a slurry. The lime or calcined dolomite used for precipitation in this case can be either in slurry form or in the form of a dry powder, and it may contain a relatively high percentage of impurities. The impure magnesium hydroxide slurry is then passed to the controlled carbonation operation 93 which can be carried out by the controlled procedure previously described, to produce large crystals of neutral magnesium carbonate. The carbonated material from 93 is then passed to the separating operation 94 for removal of the desired neutral magnesium carbonate, which can then be washed as indicated. The overflow from 94 contains the impurities, which include calcium carbonate. As in the other procedures the removed neutral magnesium carbonate can be subjected to further treatment for the production of various magnesium compounds.

With respect to the type of materials which can be utilized for the production of magnesium compounds, further reference can be made to various residue mixtures containing magnesium oxide or other magnesium containing compounds. For example we can employ the residue resulting from the carbothermic process for the manufacture of magnesium metal, which consists of unreacted or back-reacted magnesium oxide, carbon, and other solid impurities. Such a residue can be treated in accordance with the procedures previously described for the production of a relatively pure form of magnesium oxide. Where dolomite is being utilized as a source of magnesium oxide for use in the carbothermic process, it is possible to utilize a complete process such as shown in Figure 8. Thus in this instance a magnesium containing mineral like dolomite or magnesite is subjected to calcining 97 and the calcined material is then subjected to slaking 98. The slaked material is then subjected to the controlled carbonating operation 99 for the production of large crystalline particles of neutral magnesium carbonate. The carbonated material is subjected to the separating operation 101 for the removal of the desired neutral magnesium carbonate, and this material is then dried and calcined at 102, to form magnesium oxide. The magnesium oxide is briquetted at 103 with carbon, and these briquets are then supplied to the carbothermic process 104. In the carbothermic process the briquets are heated to an elevated temperature for reducing the magnesium oxide with carbon to form magnesium metal, after which the impure powder is retorted. There results from the carbothermic process a residue containing considerable residual unreacted or back-reacted magnesium oxide and carbon. This residue can then be retreated for the removal of its magnesium content, as by returning the same to the slaking operation 98. It will be apparent that return of the residue in this fashion will result in removal of carbon in the separating operation 101. This process is preferable to one in which part or all of the retort residue is directly reintroduced before the briquetting operation 103. The latter method tends to build up impurities in the cycle and causes difficulties in the briquetting operation because of the inconsistent composition of the residue and other factors. If magnesium carbonate is recovered from the retort residue itself by controlled carbonation as described above, the overflow from the classifying operation consists essentially of finely divided carbon which can be dried and used as a fuel for calcination of the magnesium carbonate.

In general our invention utilizes simple equipment whereby large capacity can be obtained without undue capital investment. It is applicable to a wide variety of raw material sources, and therefore plants using such a process may be located close to available markets.

The copending and co-assigned application of Edgar B. Baker, Serial No. 551,331, filed August 26, 1944, now Patent No. 2,442,481, is directed to similar subject matter and reference herein is accordingly made thereto.

We claim:

1. In a process for separating out a magnesium compound from an impure hydrous slurry containing one or more magnesium compounds from a group comprising magnesium oxide and magnesium hydroxide, the steps of subjecting a mass of the slurry to contact with a carbon dioxide containing gas, continuously supplying both said slurry and carbon dioxide containing gas to the mass undergoing treatment, controlling the rate of introduction of the slurry and the carbon dioxide containing gas to the mass undergoing treatment so as to maintain the rate of conversion of the magnesium compound to normal magnesium carbonate not in excess of about 0.12 mol per gallon per hour, and the concentration of the carbon dioxide and carbonic acid in the liquid phase in the slurry between the limits of 0.02 to 0.05 mol per liter, such carbonation serving to produce particles of neutral magnesium carbonate of the order of 200 to 400 microns in size, and separating out the neutral magnesium carbonate from the other material of the slurry.

2. A process as in claim 1 in which the initial slurry is one formed by subjecting sea water containing convertible magnesium salts to pretreatment for the purpose of removing impurities and soluble phase calcium bicarbonate, the pretreatment involving reaction of the sea water with calcium hydroxide whereby the calcium content of the sea water is precipitated as solid phase calcium carbonate and whereby a portion of the convertible magnesium salts is precipitated as magnesium hydroxide, the slurry being obtained as a sludge containing the magnesium hydroxide and calcium carbonate precipitated from the sea water during said pretreatment.

3. A method as in claim 1 in which the initial slurry is one obtained by reacting brine containing convertible magnesium salts with calcium hydroxide to substantially completely precipitate the convertible magnesium salts as magnesium hydroxide, and then permitting the precipitated material to settle to form the slurry.

4. In a process of the character described, the steps of slaking a material containing magnesium and calcium oxide to form a slurry, reacting the slurry with alkali metal carbonate to convert the calcium content of the slurry to calcium carbonate, separating out the solid phase material of the slurry from the liquid phase which contains alkali metal hydroxide, subjecting the solid phase material in slurry form to treatment for the removal of the major part of the magnesium content from the same, said last named step being carried out by controlled carbonation so as to form large crystals of neutral magnesium carbonate which are separated out from the slurry of other solid phase material, subjecting the remaining slurry of solid phase material to reaction with alkali metal hydroxide so as to convert the magnesium carbonate content of the same to magnesium hydroxide, and then carbonating the slurry so as to produce additional large size crystals of neutral magnesium carbonate.

5. In a method of the character described, the steps of slaking a material containing both magnesium and calcium oxides to form a slurry, reacting the slurry with an alkali metal carbonate to convert the calcium content to calcium carbonate, separating the solid phase material of the slurry from the liquid phase which contains alkali metal hydroxide, subjecting the solid phase material in slurry form to controlled carbonation to cause the bulk of the magnesium content of the same to be converted to large crystals of neutral magnesium carbonate, separating out the large crystals of neutral magnesium carbonate from the remaining material, causing the removed neutral magnesium carbonate to be reacted with alkali metal hydroxide whereby the magnesium content of the same is converted to magnesium hydroxide, removing the resulting solids from the liquid phase material, subjecting a slurry of the solids to controlled carbonation to again form large crystals of neutral magnesium carbonate, and then separating out the last named neutral magnesium carbonate from the other solids.

6. In a method of the character described, the steps of slaking a material containing both magnesium and calcium oxide, thereby forming a slurry, reacting the slurry with sodium carbonate whereby the calcium content is converted to calcium carbonate, and dissolved sodium hydroxide is formed by the reaction, subjecting the material to separation whereby the dissolved sodium hydroxide is removed from the solid phase material, the solid phase material including calcium carbonate and magnesium hydroxide, forming a slurry of the solid phase material, subjecting the slurry to carbonation controlled to form large particles of neutral magnesium carbonate, separating the neutral magnesium carbonate from other solid phase material, whereby the separated fine solid phase material contains calcium carbonate and other solid phase impurities, subjecting the removed neutral magnesium carbonate to reaction with sodium hydroxide, the sodium hydroxide being obtained from the first named separating operation, the reaction serving to convert the neutral magnesium carbonate to magnesium hydroxide, thickening and washing the resulting slurry whereby sodium carbonate is removed in liquid phase and whereby the remaining solids consist of magnesium hydroxide with solid impurities, forming a slurry of the remaining solids, subjecting such slurry to controlled carbonation to produce large crystals of neutral magnesium carbonate, and then separating out said last named neutral magnesium carbonate to form a relatively pure magnesium compound, the sodium carbonate removed in the aforesaid thickening and washing operation being used in the first named reaction of the initial slurry with sodium carbonate.

7. In a process of the character described, the steps of slaking calcined dolomite of granular type with water to form a slurry for further treatment, reacting the slurry with solium carbonate so that the calcium content is converted to calcium carbonate, and whereby dissolved sodium hydroxide is produced as a result of the reaction, separating out the dissolved sodium hydroxide from the remaining solids, forming a slurry of the remaining solids for further treatment, submitting such slurry to classification whereby a fine fraction is caused to pass out in an overflow and a coarse fraction in an underflow, treating the overflow slurry to controlled carbonation to form relatively large size particles of neutral magnesium carbonate, said controlled carbonation being carried out by subjecting a mass of the overflow slurry to contact with a carbon dioxide containing gas, continuously supplying both said overflow slurry and carbon dioxide containing gas to the mass undergoing treatment, controlling the rate of introduction of the slurry and the carbon dioxide containing gas to the mass undergoing treatment to maintain the rate of conversion of the magnesium compound to normal magnesium carbonate not in excess of about 0.12 mol per liter per hour and the concentrate of the carbon dioxide and carbonic acid in the liquid phase in the slurry between the limits of 0.02 to 0.05 mol per liter, such carbonation serving to produce particles of neutral magnesium carbonate of the order of 200 to 400 microns in size, removing the neutral magnesium carbonate from other solid phase material after said controlled carbonation, subjecting the underflow containing the coarse fraction from the classifying operation to carbonation to produce neutral magnesium carbonate of relatively small particle size, subjecting the carbonated material to separation whereby the small particle size neutral magnesium carbonate is removed in an overflow, and then merging said last mentioned overflow with the large size crystals of neutral magnesium carbonate for further treatment.

GUNTER H. GLOSS.
EDGAR B. BAKER.

REFERENCES CITED

The following references are of record in the file of this patent:

UNITED STATES PATENTS

| Number | Name | Date |
| --- | --- | --- |
| 539,889 | D'Andria | May 28, 1895 |
| 734,030 | Young | July 21, 1903 |
| 1,415,391 | Rafsky | May 9, 1922 |
| 1,449,696 | Pike | May 27, 1923 |
| 1,505,202 | Judd | Sept. 19, 1924 |
| 1,573,632 | Crowell | Feb. 16, 1926 |
| 1,863,966 | Brosche | June 21, 1932 |
| 2,012,854 | Hill | Aug. 27, 1935 |
| 2,066,066 | Brooks et al. | Dec. 29, 1936 |
| 2,139,934 | Chesny | Dec. 13, 1938 |
| 2,140,375 | Allen | Dec. 13, 1938 |
| 2,198,223 | Muskat et al. | Apr. 23, 1940 |
| 2,211,908 | O'Connor | Aug. 20, 1940 |
| 2,358,818 | Miller | Sept. 26, 1944 |

FOREIGN PATENTS

| Number | Country | Date |
| --- | --- | --- |
| 176,785 | Great Britain | Jan. 18, 1923 |
| 447,246 | Great Britain | May 14, 1936 |